TURNTABLE DRIVE FOR TALKING MACHINES USING DISK RECORDS

Filed June 12, 1951 4 Sheets-Sheet 1

INVENTORS
Lawrence V. Guest
Percy Shephard
By Ralph B. Stewart
attorney

TURNTABLE DRIVE FOR TALKING MACHINES USING DISK RECORDS

Filed June 12, 1951 4 Sheets-Sheet 2

INVENTORS
Lawrence V. Guest
Percy Shephard
By Ralph B. Stewart
attorney

TURNTABLE DRIVE FOR TALKING MACHINES USING DISK RECORDS

Filed June 12, 1951 4 Sheets-Sheet 3

INVENTORS
Lawrence V. Guest
Percy Shephard
By Ralph B. Stewart
Attorney

Dec. 16, 1952 L. V. GUEST ET AL 2,621,527

TURNTABLE DRIVE FOR TALKING MACHINES USING DISK RECORDS

Filed June 12, 1951 4 Sheets-Sheet 4

INVENTORS
Lawrence V. Guest
Percy Shephard
By Ralph B. Stewart
attorney

Patented Dec. 16, 1952

2,621,527

UNITED STATES PATENT OFFICE 2,621,527

TURNTABLE DRIVE FOR TALKING MACHINES USING DISK RECORDS

Lawrence Vincent Guest and Percy Shephard, Old Hill, England

Application June 12, 1951, Serial No. 231,142
In Great Britain June 28, 1950

7 Claims. (Cl. 74—199)

The present invention relates to improvements in turntable drives for disc talking machines of the kind in which rotation is imparted to the turntable by the engagement of a friction wheel between a circumferential surface on the turntable, usually the inner or outer surface of a peripheral rim provided thereon, and a driving pulley rotated at a substantially constant speed by a relatively high speed motor. The driving pulley may be a pulley fixedly mounted on the shaft of the motor or it may be an intermediate pulley engaged between a pulley on the motor spindle and the friction wheel.

In apparatus of this kind it is well known to use a stepped driving pulley and to arrange for the friction wheel to make driven engagement alternatively with one or another of the parts of the stepped pulley of different diameters to change the transmission ratio between the motor spindle and the friction wheel and therefore the speed of rotation of the turntable.

The present invention is directed to providing an improved arrangement for enabling the transmission ratio between the motor spindle and the friction wheel and thereby the speed of the turntable to be changed.

The present invention consists in turntable driving means of the kind including a stepped pulley driven by the motor and a friction wheel adapted to engage between the stepped pulley and a circumferential surface on the turntable, the stepped pulley and friction wheel being disposed for relative axial movement to enable engagement to be made between the friction wheel and alternative parts of the stepped pulley of different diameter, characterised in that at the junction of two adjacent parts of the stepped pulley of different diameter a cam or projection is provided of which the maximum dimension radially of the axis of said pulley approximates to the radius of the larger of said two adjacent parts, and in that one of the two members comprising the friction wheel and the stepped pulley which is arranged for axial movement relative to the other, is biased in the axial direction for transfer of the engagement between the friction wheel and the smaller of the said two adjacent parts of the stepped pulley to engagement between the friction wheel and the larger of said two adjacent parts of the stepped pulley. Where the direction of movement of the axially movable member to effect said transfer is downwards, the bias may be gravity, by a spring or by gravity assisted by a spring, and where the direction of said movement is upwards the bias may be by a spring capable of overcoming the weight of the axially movable parts.

Since the distance between the axes of the friction wheel and the stepped pulley is changed when the speed ratio between these members is changed, it is necessary to provide for further relative movement of part of the friction gear to ensure effective engagement between the several frictional surfaces of the gear and the turntable in both or all of the set positions of the mechanism.

For this purpose the friction wheel may be mounted on an axis spindle capable of movement parallel to itself and biased towards the space between the points of contact of the friction wheel with the pulley and the turntable rim so that effective driving engagement between the friction surfaces is maintained.

The larger diameter part of the stepped pulley is usually, though not invariably, the lower part and usually the friction wheel is arranged to make the rising and falling movements necessary to effect the change in speed of the turntable.

The invention is illustrated by way of example in the accompanying drawings as applied to an arrangement providing three alternative turntable speeds.

Figure 1:
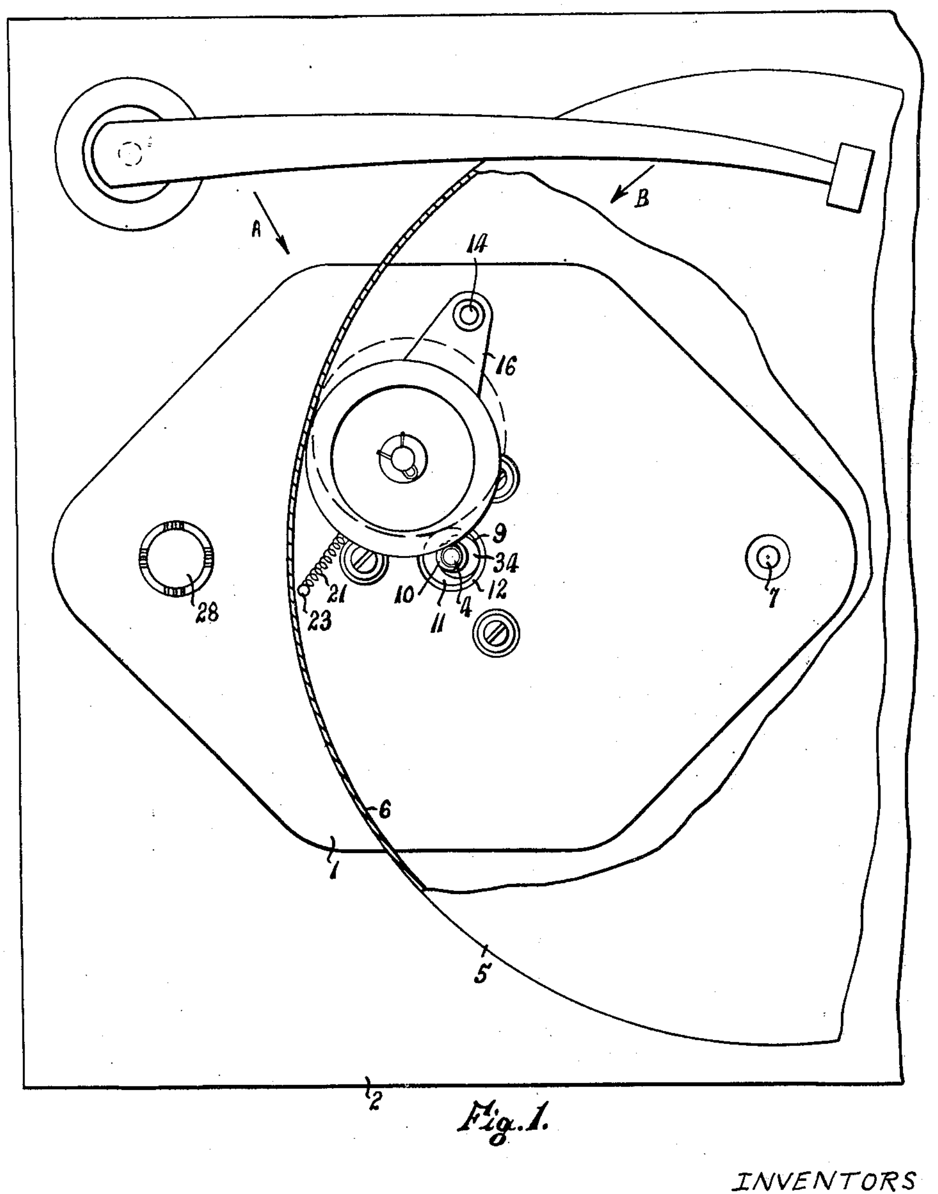
Figure 1 is a plan view of a part of a talking machine with a part of the turntable shown cutaway for convenience of illustration.

Referring to the drawings, 1 represents the usual motor board of a talking machine mounted in a cabinet 2 and carrying on its underside a driving motor 3, usually an electric motor as shown, of constant speed type the spindle 4 of which projects through and above the motor board 1. The turntable 5 is a metal pressing having a downwardly depending edge flange 6, and is mounted for rotation with a turntable spindle 7 carried in a bearing member 8 supported by the motor board 1.

On the upper end of the motor spindle 4 located beneath the turntable 5 is fixedly mounted a stepped pulley 9 having three coaxially arranged cylindrical driving parts 10, 11 and 12 of different diameter with the largest 12 at the bottom and the smallest 10 at the top and a friction wheel 13 provided with a rubber rim engages between the pulley 9 and the inner surface of the turntable edge flange 6 as shown in Figure 1 to rotate the turntable 5 at any one of three constant speeds according as the friction wheel 13 is engaged with one or other of the parts 10, 11 or 12 of the stepped pulley 9.

To enable a desired turntable speed to be selected the friction pulley 13 is arranged to be raised and lowered to enable its rubber rim to be engaged with a selected one of the parts 10, 11 and 12 of the pulley 9.

Figure 5:
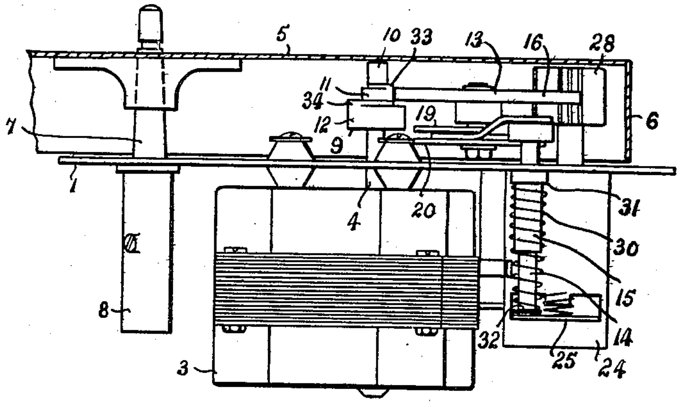
Figure 5 is a further part sectional side elevation taken in the direction of the arrow B in Figure 1.
Figure 6:
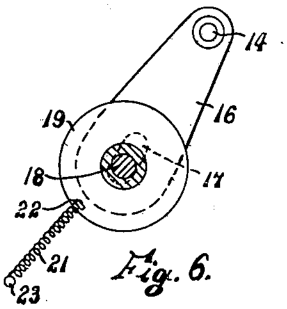
Figure 6 is a view in sectional plan showing the method of mounting the friction wheel spindle.
Figure 8:
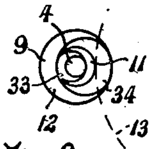
Figures 7 to 12 are detail views showing successive relative positions of the friction wheel and the stepped pulley in changing from middle speed to highest speed conditions and Figures 13 and 14 show diagrammatically and in plan and elevation respectively, an alternative arrangement.
Figure 7:
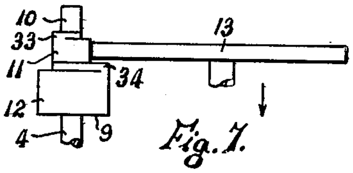

The mounting and control of the friction wheel 13 for this purpose is as follows:

A post 14 is mounted for rising and falling and rotational movement in a vertical guide sleeve 15 fixed to the motor board 1 and at the upper end of the post 14 is fixed a laterally extending arm 16 having a longitudinal slot 17 (Figure 5) near its free end through which extends a pin 18, washers 19 and 20 being fixed to said pin 18 above and below the arm 16 respectively and a tension spring 21 being connected between a lug 22 on the upper washer 19 and a fixed anchorage 23 on the motor board, the said spring 21 extending in the general direction longitudinally of the arm 16 and away from the post 14.

The friction wheel 13 is mounted for rotation without any substantial axial movement on the pin 18. The space between the pulley 9 and any point of engagement of the friction wheel 13 with the turntable edge flange 6 is less than the diameter of the friction wheel 13 and the disposition of the parts is such that a line joining the axis of the post 14 and the fixed anchorage 23 of the spring 21 passes through the space between the points of contact of the friction wheel 13 with the pulley 9 and with the turntable edge flange 6 (Figure 1), and it will readily be seen that the tension spring 21 will tend to draw the axis pin 18 of the friction wheel 13 along the slot 17 in the arm 16 away from the post 14, and also to move the arm 16 about the axis of the post 14 in such a manner as to maintain effective engagement of the friction wheel 13 with the pulley 9 and the turntable edge flange 6.

Figure 2:
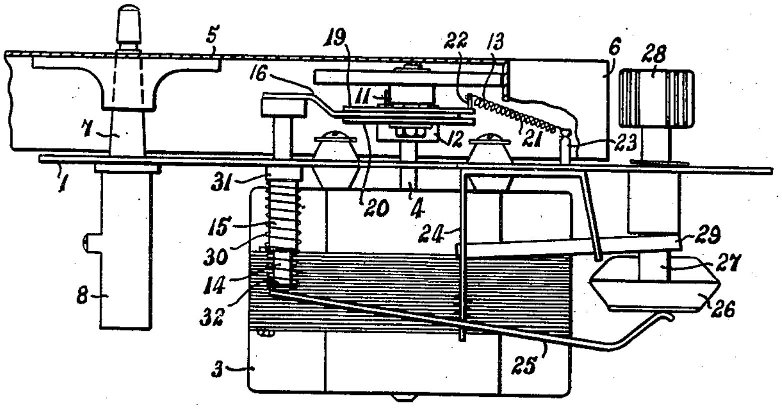
Figures 2, 3 and 4 are views in part sectional side elevation taken in the direction of the arrow A in Figure 1 and showing the change speed mechanism in the three different positions.
Figure 3:
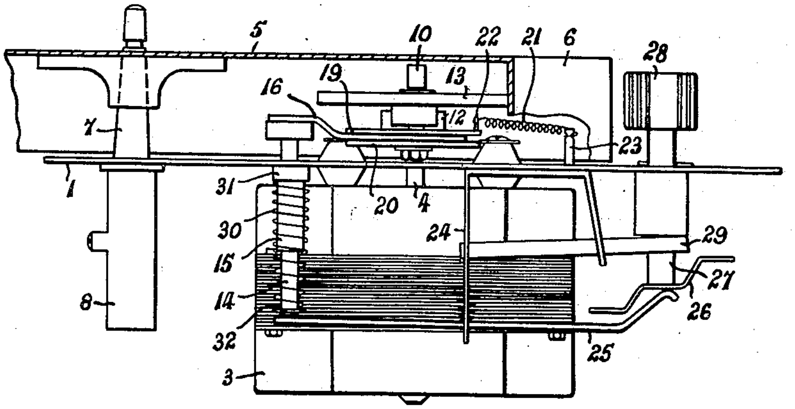

Beneath the motor board 1 is fixedly mounted an apertured bracket 24 through which extends a lever 25 rockable about a fulcrum formed by the bracket 24. One end of this lever 25 extends beneath the lower end of the post 14 and the other end is arranged to co-operate with a three-position cam 26 (Figures 2, 3 and 4) carried at the lower end of a rod 27 rotatable between three alternative positions by means of a control knob 28 accessible above the motor board 1. In the case illustrated the lower end of the rod 27 is of square section and is engaged by a leaf spring 29 anchored to the bracket 24, whereby the cam 26 is maintained as set.

The post 14 is biased downwards in the guide sleeve 15, towards a position of engagement with the end of the lever 25 either by gravity or, as in the case shown, by means of a compression spring 30 surrounding the post 14 and sleeve 15 and extending between a shoulder 31 on the sleeve 15 and a washer 32 on the lower end of the post 14.

At the two junctions of the three parts of different diameter 10, 11 and 12, of the pulley 9 are formed cams 33 and 34 of which the maximum radial length is not substantially less than, and in the case illustrated is equal to, the radius of the adjacent part 11 or 12 of the larger diameter, and of an axial length or thickness which is small compared with the axial length of the adjacent part 10 or 11 of the smaller diameter. As shown in the drawing. the cam portions 33 and 34 also constitute stepped portions of the pulley 9, but these cam portions are eccentric with respect to the common axis of driving portions 10, 11 and 12.

With the turntable 5 rotating under the drive of the motor 3 the speed change operation is as follows:

Assuming that the turntable is rotating at middle speed, i. e. with the friction wheel 13 engaged between the turntable edge flange 6 and the medium diameter part 11 of the pulley. If it is desired to change to low turntable speed, the control knob 28 is rotated with the rod 27 and cams 26 into the position shown in Figure 2 in which the lever 25 has been rocked to lift the post 14 and raise the arm 16 together with the friction wheel 13 carried thereby to an extent to cause the edge of the friction wheel to pass upwards beyond the junction between the parts 10 and 11 and the cam 33, whereupon the friction wheel 13 is drawn by the spring 21 into effective engagement between the part 10 of the pulley 9 and the turntable edge flange 6.

Figure 4:
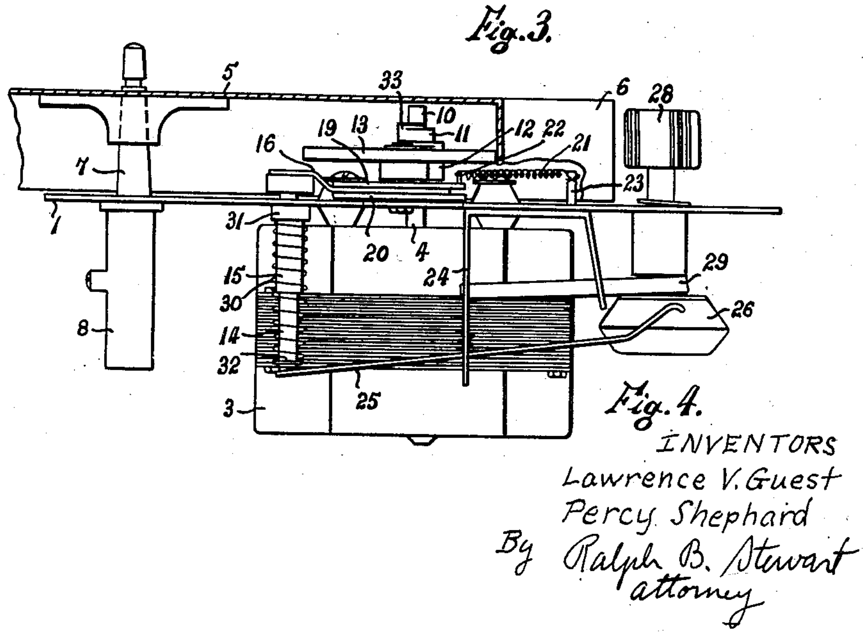
Figure 10:
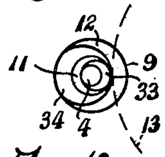
Figure 9:
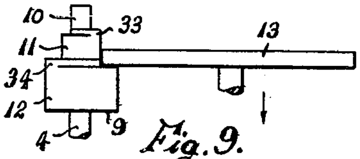
Figure 11:
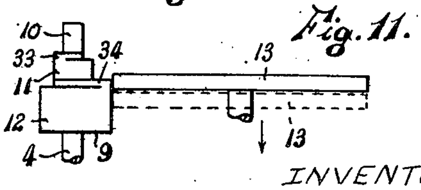
Figure 12:
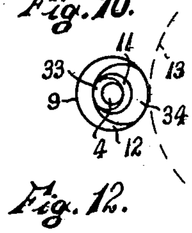

If on the other hand it is desired to change from the middle speed condition of Figures 3, 5, 7 and 8 to the highest speed condition, the control knob 28 is rotated to move the lever 25 to the position shown in Figure 4 so that the post 14 is permitted to move downwards together with the arm 16 and the friction wheel 13, by gravity or, in the case shown, under the urge of the spring 30, until the rim of the friction wheel 13 engages and rests, either upon the shoulder formed by the annular upper surface of the part 12 of the pulley 9, or first upon the upper surface of the cam 34 and thereafter upon the said shoulder when the cam 34 moves from beneath said rim, as shown in Figures 9 and 10. The position of the lever 25 is such that at this point the lower end of the post 14 is spaced by a small distance above the end of the lever. During the succeeding revolution of the pulley 9, the rim of the friction wheel 13 is engaged by the outer edge of the cam 34 and the wheel 13 thrown outwards to a position outside the periphery of the part 12, as shown in full lines in Figure 11, the arm 16 moving about the axis of the post 14 and the axis pin 18 moving in the slot 17 in the arm 16 against the tension spring 21. Due to the downward bias on the post 14, the said post, arm 16 and friction wheel 13 now move downwards to a position as shown in Figure 4 in which the lower end of the post 14 rests upon the end of the stationary lever 25 and the friction wheel 13 is in engagement with the peripheral surface of the part 12 of the pulley 9 as shown in dotted lines in Figures 11 and 12. The tension spring 21 ensures effective frictional engagement of the friction wheel 13 between the pulley 9 and the turntable edge flange 6.

With the friction wheel in the low speed position, engaged with the part 10 of the pulley (Figure 2), a change to the middle speed position of engagement with part 11 of the pulley is effected in a similar manner to that just described in changing from middle speed to high speed, the control knob 28 being moved to rock the lever 25, and the upper cam 33 at the junction of the pulley parts 10 and 11 functioning to throw the friction wheel 13 outwards as a preliminary to the necessary downward change-over movement of the latter.

Change from high speed engagement of the friction wheel 13 with part 12 of the pulley to middle speed engagement with part 11 is effected by manipulation of the knob 28 to rock the lever 25 and raise the post 14, arm 16 and friction wheel 13 directly through the vertical distance appropriate to engage the friction wheel 13 with part 11.

Whilst in the embodiment above described the friction wheel 13 is arranged to be raised and lowered to effect the turntable speed changes it will be understood that the friction wheel may be held against vertical movement and the pulley 9 raised and lowered. For example a pulley splined for sliding movements on its axis spindle may be used. Again whilst a pulley 9 has been described in which the largest diameter part is lowermost it will be understood that the reverse arrangement may be employed. It is a condition, however, that the vertically movable member, whether the friction wheel or the pulley, shall be biased either by gravity or by auxiliary biasing means in the direction for movement from a lower to a higher speed condition.

Figure 13:
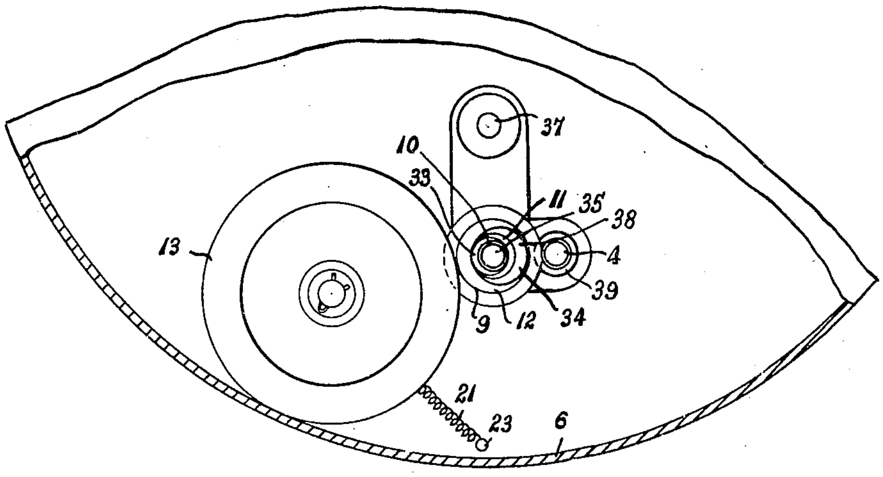
Figure 14:
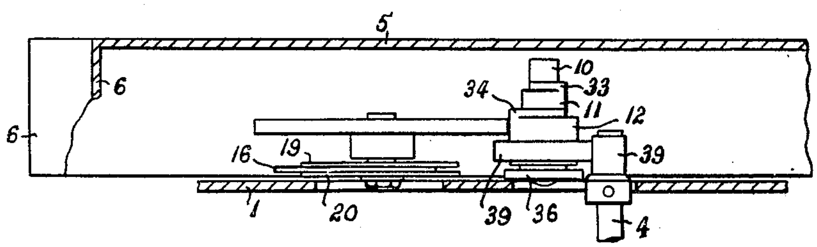

In Figures 13 and 14 there is illustrated diagrammatically an alternative arrangement.

In this case the stepped pulley 9 is mounted on an axle 35 separate from the motor spindle 4, the axle being carried at the end of an arm 36 movable about a fixed pivot 37, the pulley 9 being provided with a rubber tyre 38 making driven engagement with a plain cylindrical pulley 39 on the motor spindle 4 and the friction wheel 13 engaging between one or other of the parts 10, 11, 12 of the separate stepped pulley 9 and the turntable edge flange 6 and being mounted and controlled in a manner similar to that of the previously described construction.

This arrangement permits the ready application or substitution of stepped pulleys 9 of alternative diametrical dimensions suitable for use with a friction wheel 13 of a standard form and diameter and available motor spindles 39 which are of various diameters.

We claim:

1. Change-speed driving means for the turntable of a talking machine using disc records, comprising a stepped pulley, a friction wheel having frictional driving engagement between the stepped pulley and a circumferential surface on the turntable, carrier means mounting said friction wheel for movement in its plane of rotation, means biasing said friction wheel in its plane of rotation in a direction to maintain its engagement with said stepped pulley and with said circumferential surface on the turntable, means to impart relative movement between said stepped pulley and said friction wheel in the direction of their axes, means for biasing one of the two members comprising the said stepped pulley and the said friction wheel for movement in the axial direction for transfer of the engagement between the friction wheel and a smaller of two adjacent parts of the stepped pulley of different diameter to engagement between the friction wheel and the larger of said two adjacent parts of the stepped pulley, and said pulley having a radially extending eccentric cam portion interposed between two adjacent driving parts of the stepped pulley of different diameters, said cam portion having a maximum radial dimension substantially equal to the radius of the larger of said two adjacent driving parts of the stepped pulley.

2. Change-speed driving means for the turntable of a talking machine using disc records, comprising a stepped pulley, a friction wheel having frictional driving engagement between the stepped pulley and a circumferential surface on the turntable, an axis member for said friction wheel, a carrier for said axis member on which carrier said axis member is movable parallel to itself so that said friction wheel is movable in its plane of rotation, means biasing said axis member relative to the said carrier in a direction to maintain the engagement of the friction wheel with said stepped pulley and with said circumferential surface on the turntable, means to impart movement to the said carrier parallel with the axis of said pulley whereby said axis member and said friction wheel are moved in a direction axially of said stepped pulley, resilient means biasing said friction wheel in the axial direction for transfer of the engagement between the friction wheel and a smaller of two adjacent parts of the stepped pulley of different diameter to engagement between the friction wheel and the larger of said two adjacent driving parts of the stepped pulley, said pulley having a radially extending eccentric cam portion interposed between two adjacent driving parts of the stepped pulley of different diameters, said cam portion having a maximum radial dimension substantially equal to the radius of the larger of said two adjacent driving parts of the stepped pulley.

3. Change-speed driving means as claimed in claim 1 wherein said friction wheel is provided with an axis member mounted on said carrier means for limited movement in all directions parallel to itself relative to said carrier means.

4. Change-speed driving means for the turntable of a talking machine using disc records, comprising a stepped pulley, a friction wheel having frictional driving engagement between the stepped pulley and a circumferential surface on the turntable, an axis member for said friction wheel, a carrier for said axis member on which said axis member is movable parallel to itself, said carrier comprising a vertically movable and rotatable post mounted with its axis parallel with the axis of said pulley and a radially extending arm fixed to said post and supporting said axis member, means biasing said radially extending arm about the axis of the said rotatable post of the carrier to maintain frictional engagement of the friction wheel with the stepped pulley and with the circumferential surface on the turntable, means to impart movement to said carrier axially of said post whereby said axis member and said friction wheel are moved in a direction axially of said stepped pulley, means biasing said carrier in the axial direction of said post for transfer of the engagement between the friction wheel and a smaller of two adjacent driving parts of the stepped pulley of different diameters to engagement between the friction wheel and the larger of said two adjacent parts of the stepped pulley, and said stepped pulley having a radially extending eccentric cam portion interposed between two adjacent driving parts of the stepped pulley of different diameters, said cam portion having a maximum radial dimension substantially equal to the radius of the larger of said two adjacent driving parts of the stepped pulley.

5. Change-speed driving means for the turntable of a talking machine using disc records, comprising a stepped pulley, a friction wheel having frictional driving engagement between the stepped pulley and a circumferential surface on the turntable, an axis member for said friction wheel, a carrier for said axis member on which said axis member is movable parallel to itself, said carrier comprising a vertically movable and rotatable post mounted with its axis parallel with the axis of said pulley and a radially extending arm fixed to said post and supporting said axis member, means biasing said radially extending arm about the axis of the said rotatable post of the carrier to maintain frictional engagement of the friction wheel with the stepped pulley and with the circumferential surface of the turntable, means to impart movement to said carrier axially of said post whereby said axis member and said friction wheel are moved in a direction axially of said stepped pulley, a spring surrounding the post of the carrier and biasing said carrier in the axial direction of the post for transfer of the engagement between the friction wheel and a smaller of two adjacent driving parts of the stepped pulley of different diameters to engagement between the friction wheel and the larger of said two adjacent parts of the stepped pulley, and said stepped pulley having a radially extending eccentric cam portion interposed between two adjacent driving parts of the stepped pulley of different diameters, said cam portion having a maximum radial dimension substantially equal to the radius of the larger of said two adjacent driving parts of the stepped pulley.

6. Change-speed driving means as claimed in claim 1 and including a rotary spindle mounted parallel with the axis of said stepped pulley, and a friction pulley carried by said spindle and having driving engagement with said stepped pulley.

7. In a change-speed driving arrangement for driving the turntable of a talking machine using disc records, the combination of a rotary member comprising a stepped pulley having cylindrical driving parts of different diameters mounted for rotation on an axis parallel with the axis of said turntable, a second rotary member comprising a friction wheel interposed between said stepped pulley and said turntable with its axis parallel with the axis of the turntable, said wheel having frictional driving engagement with said pulley and with a circumferential surface on the turntable, carrier means mounting said friction wheel for movement in its plane of rotation, resilient means biasing said friction wheel in its plane of rotation in a direction to maintain its engagement with said pulley and with said circumferential surface, means mounting one of said rotary members for axial movement to position said wheel for engagement with different driving steps on said pulley, manually operable means for shifting said axially-movable member in a direction to cause said pulley to engage driving steps of smaller diameter resilient means normally tending to shift said axially-movable member in the opposite direction, and said pulley having an eccentric cam portion interposed between two adjacent driving steps of different diameters, said cam portion being of stepped form and having a maximum radial dimension substantially equal to the radius of the larger of said two adjacent driving steps.

LAWRENCE VINCENT GUEST.
PERCY SHEPHARD.

REFERENCES CITED

The following references are of record in the file of this patent:

UNITED STATES PATENTS

| Number | Name | Date |
|---|---|---|
| 765,956 | Bucknam | July 26, 1904 |
| 2,438,264 | Bender, Jr. | Mar. 23, 1948 |
| 2,438,265 | Metzner | Mar. 23, 1948 |

FOREIGN PATENTS

| Number | Country | Date |
|---|---|---|
| 199,114 | Great Britain | June 14, 1923 |